May 8, 1945.  K. H. HUBBARD ET AL  2,375,300
CONDITION RESPONSIVE MEASURING INSTRUMENT
Filed June 26, 1942  2 Sheets-Sheet 2
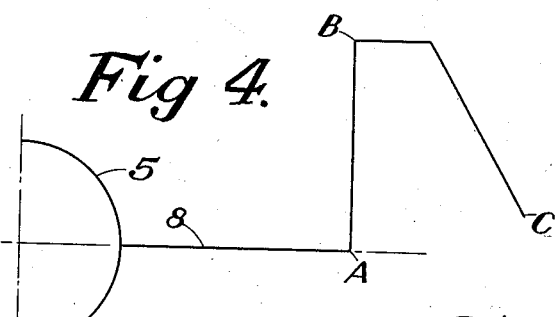
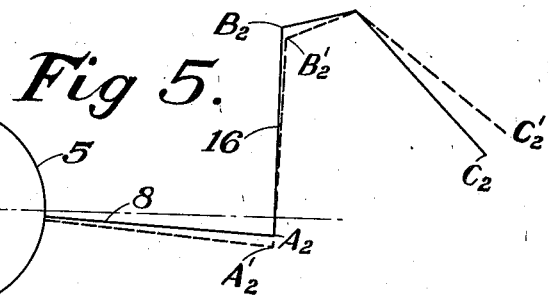
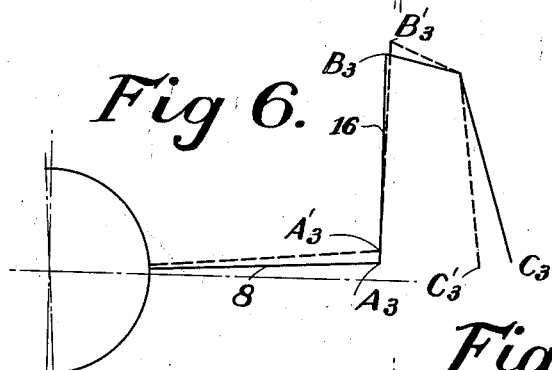
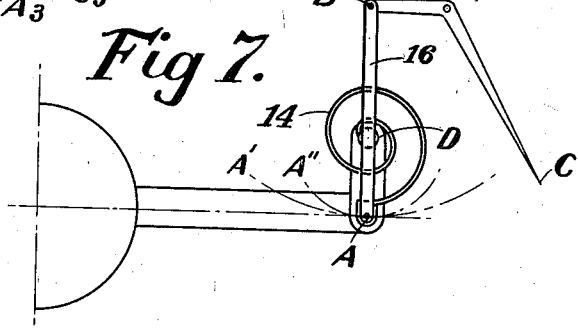
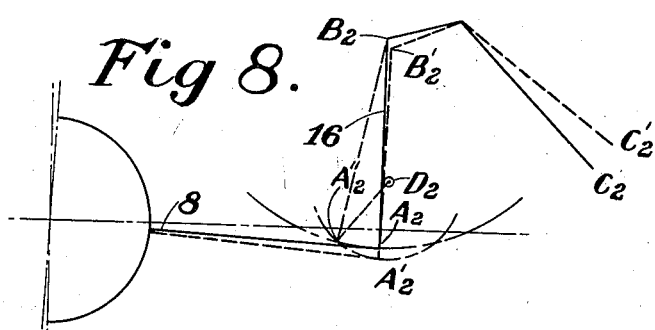
INVENTOR
K.H. HUBBARD
H.L. MASON
BY J.L. LEACH
ATTORNEY Patented May 8, 1945

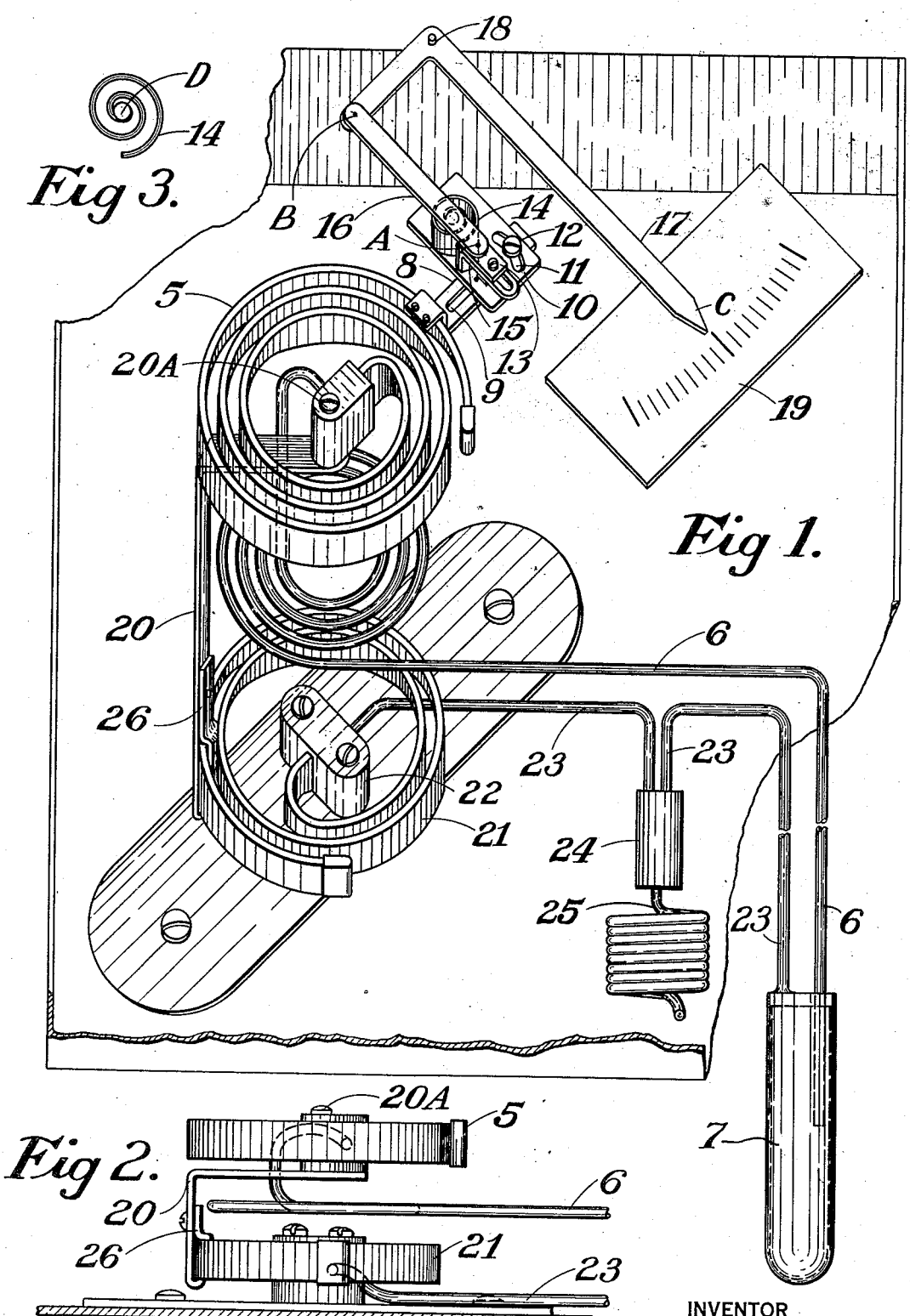

2,375,300

UNITED STATES PATENT OFFICE 2,375,300

CONDITION RESPONSIVE MEASURING INSTRUMENT

Karl H. Hubbard, Henry L. Mason, and Jonathan L. Leach, Rochester, N. Y., assignors to Taylor Instrument Companies, Rochester, N. Y., a corporation of New York Application June 26, 1942, Serial No. 448,670

5 Claims. (Cl. 73—370).

This invention relates to measuring instruments and especially to temperature compensated measuring instruments of the tube system type.

The tube systems of such instruments are frequently subjected to environmental temperature changes which tend to introduce errors in the instrument reading. While various arrangements have been proposed to compensate for such errors, these arrangements have failed to reduce the amount of such errors to a negligible amount where highly expansible fluids are employed as the sensing medium.

The present invention has for its purpose an improved temperature compensated measuring instrument having a high degree of accuracy and reliability.

The various features and advantages of the invention will appear from the detailed description and claims when taken with the drawings in which:

Fig. 1 is an exploded view with certain of the parts thereof distorted to disclose more clearly their arrangement;

Fig. 2 is a front elevation of the double Bourdon spring assembly;

Fig. 3 is a detail view of a bimetallic compensating coil included in the instrument; and Figs. 4 to 8 inclusive are exaggerated diagrams useful in explaining the invention.

The present instrument includes a conventional tube system comprising a spirally wound Bourdon spring 5 having its interior communicating through a relatively long capillary tube 6, with the interior of the bulb 7, which bulb serves as a sensing element for a varying condition, such as temperature or pressure and the like. This tube system is completely filled with a liquid responsive to variations in the condition to be sensed at the bulb 7. The outer end of the Bourdon spring has secured thereto a take-off arm 8. This arm is slotted lengthwise as indicated at 9 to receive means for securing a bracket 10 in generally right angular relation thereto, so that the bracket can be adjusted along the slot for use in calibrating the instrument. The bracket is also provided with an arcuate slot 11 to receive a clamping screw 12 for adjustment of the bracket 10 angularly with respect to the take-off arm 8 for use in adjusting the compensation of the instrument. The free end of the bracket 10 has a lug D (Fig. 3) projecting at right angles therefrom. This lug has fixed thereto, one end of a bimetallic compensating coil 14 wound into spiral form. It will be understood, however, that a bimetallic strip, straight or U-shaped, as well as other temperature responsive elements, could serve as well as the coil. The other end of the compensating coil 14 has fixed thereto an arm 15 extending in a direction parallel to the plane of the bracket 10. The arm 15 has mounted thereon, an adjustable pivot plate 13 which is provided with a pivot A (Fig. 4). Arm 15 is connected by a link 16 and by pivots A and B to an index or pen arm 17 mounted on the fixed pivot 18 and adapted to be moved over a dial or chart 19, as a function of the variations in the changing condition to be measured at bulb 7.

The ambient temperatures prevailing along the various parts of the tube system including the capillary tube 6 and the Bourdon spring 5, tend to introduce errors into the measurement of the condition to be measured. For this reason there are provided arrangements to compensate for these temperature errors. In the arrangement here shown the inner end of the Bourdon spring 5 is mounted on an angular bracket 20 by means of screw 20A, to provide rotary adjustment about screw 20A for purposes to be described. The lower end of this bracket is clamped as indicated at 26 on the movable end of a second spirally wound Bourdon spring 21 for adjusting along this spring to effect compensation for ambient temperatures along the capillary tube outside the case, as will be set forth. The Bourdon spring 21 has its fixed end secured to a support 22 which may be mounted on the inner surface of the rear wall of the case in which the instrument mechanism is housed. It should be noted that the Bourdon springs 5 and 21 are mounted in coaxial relation and consequently their principal planes are parallel. Also, the Bourdon spring 5 is so mounted that when it unwinds, its free end moves generally in a counterclockwise direction, whereas when the spring 21 unwinds its free end moves in a clockwise direction. The fixed end of the Bourdon spring 21 communicates with a capillary tube 23 having its remote sealed end preferably anchored to the bulb 7, the whole being arranged so that the capillary tubes 6 and 23 are maintained in close relation and are therefore exposed to the same ambient temperature.

In the present arrangement, it has been found desirable to make the Bourdon spring 5 with a greater number of turns than that of the Bourdon spring 21, and consequently these Bourdon springs will have different volumes. In order that the ambient temperature effects on the fluid volumes contained in these two Bourdon springs, together with such lengths of their respective capillary tubes as are contained within the instrument case, may be suitably balanced at a given calibration point, preferably in the center of the measuring range, there is provided in series with the capillary tube 23 adjacent the spring 21 a receptacle 24 having a volume such that a suitable ratio between the two fluid volumes, is maintained. It will be appreciated that variations in manufacturing make it impossible to have the volume of all of the receptacles 24 exactly alike and likewise to duplicate Bourdon springs 5 and 21 exactly. Consequently, the receptacle 24 also communicates with a length of capillary tube 25. The tube 25, which is conveniently wound into the form of a coil, can be cut to the desired length and sealed so that the volume of the receptacle 24, together with the volume of the tube 25 will provide the desired relation between the aforesaid fluid volumes at the desired calibration point.

In order to effect the primary or capillary compensation of the instrument for ambient temperature along the portion of the capillary tubes outside of the instrument case, the bulb 7 is placed in a constant temperature bath, usually at a temperature in the center of the range on the scale 19. There is also provided a so-called cold bath and a so-called hot bath, conveniently positioned so that the portions 6 and 23 of the capillary tubes outside of the instrument case, can be immersed in either of these baths. Thereupon the clamping means 26 on the Bourdon spring 21 is released and the screw 20A loosened, so that bracket 20 may be adjusted along the periphery of spring 21 without changing the position of spring 5. The position of said bracket 20 is adjusted until a position is found such that there will be no movement of the index 17 when the mentioned capillary tubes 6 and 23 are immersed alternately in the hot and cold baths.

In order to effect compensation for ambient temperatures at the instrument case, the proper relation of the volumes of the Bourdon springs 5 and 21 and the mentioned receptacle 24 and tube 25, must be established. To do this, the bimetallic coil 14 is temporarily replaced by a rigid connection between the bracket 10 and arm 15. Thereafter the entire case is immersed alternately in the hot and cold water baths, the bulb 7 still being maintained at aforementioned constant temperature. Varying lengths of this tube 25 are immersed with the case. The remainder of tube 25 is kept at a constant temperature, the volume of liquid therein being thereby rendered inactive. By trial and error, a length of this tube is thus found which, on immersion with the case, will properly balance the volumes of the two springs 5 and 21 as well as the receptacle 24, so that no motion of the index 17 occurs as the case is transferred from the hot bath to the cold bath. The capillary tube 25 is sealed at this point and the excess thereof is cut off.

The instrument is thus compensated for ambient temperatures at the case for the one temperature of bulb 7. The bimetallic coil is next restored and adjusted by loosening screw 12 and rotating bracket 10 about pivot A until case compensation is again accurate at the previously mentioned bulb temperature in the center of the range. Then the temperature at bulb 7 is changed to a temperature near the lower end of the instrument range and thereafter to a temperature near the upper end of the range. The position of the pivot plate 13 supporting the pivot A, is adjusted along the slot in arm 15 so that the case compensation is accurate at all bulb temperatures.

In the operation of the instrument, let it first be assumed that the ambient temperatures about the Bourdon spring 5, as well as about the capillary tubes 6 and 23 remain unchanged. Therefore, the Bourdon spring 21 will be stationary at this time and the bracket 20 carried thereby will likewise be stationary so that the inner end of the Bourdon spring 5 will be temporarily held fixed. If, under the conditions assumed, the temperature about the bulb 7 increases, the fluid in the tube system will expand, causing the Bourdon spring 5 to unwind. This swings the take-off arm 8 and the bracket 10, as well as the arm 15, in a counterclockwise direction. The link 16, pivotally connected to the arm 15, swings the index or pen arm or control member 17 in a direction to indicate or to record (as the case may be), the increased temperature at the bulb 7. A drop in temperature at the bulb 7 causes the fluid in the tube system to actuate the Bourdon spring 5 and the parts connected thereto in the same manner but in the reverse sense.

It will be appreciated that if the temperature about the capillary tube 6 or the Bourdon spring 5 increases, the volume of the fluid in these portions of the system will increase and consequently the Bourdon spring will tend to unwind in the same manner as if there had been a temperature increase at the bulb 7. Similarly, a drop in the ambient temperature along the capillary tube 6 or the Bourdon spring 5 would tend to cause the volume of the fluid in the tube system to decrease and consequently the Bourdon spring 5 would tend to wind up. These changes in position of the Bourdon spring 5, due to changes in the ambient temperatures along the mentioned parts of the tube system, would constitute an error in the temperature measurement. However, the Bourdon spring 21 with its capillary tube 23 and the fluid therein, are subjected to the same ambient temperatures as those prevailing about the Bourdon spring 5 and the capillary tube 6. Therefore, when the temperature increases about the capillary 23 and the Bourdon spring 21, liquid in these parts will expand an amount sufficient to compensate for expansion of the fluid in the capillary tube 6 and the Bourdon spring 5. Thus spring 21 tends to unwind, swinging the bracket 20 and with it the inner end of the Bourdon spring 5 in a clockwise direction.

Since the Bourdon spring 21 tends to unwind in a clockwise direction, while the spring 5 tends to unwind in a counterclockwise direction, the two mentioned movements of these Bourdon springs, due to changes in the mentioned ambient temperatures, would cancel out except for the fact that the volume of the fluid in the Bourdon spring 5 will vary as the temperature varies at the bulb 7. For example, when the bulb temperature rises, the fluid in the bulb 7 expands, forcing an increased volume of the fluid into the Bourdon spring 5. Similarly, when the bulb temperature drops, the fluid in the bulb 7 contracts, withdrawing some of the fluid from the Bourdon spring 5 thereby reducing the volume of the fluid in this spring. It will be appreciated that for a given ambient temperature change around the parts in the instrument case, there will be a greater movement of the free end of the Bourdon spring 5, when the volume of the fluid therein is larger than when this volume is smaller. It is the purpose of the bimetallic coil to compensate for these errors that would otherwise arise from the combined effect of the varying temperature around the Bourdon spring 5, and the varying fluid volume in this Bourdon spring.

The operation of the bimetallic coil 14 in effecting this compensation will be understood by reference to Fig. 4 through Fig. 8. It has been mentioned that the instrument was compensated when the temperature at the bulb is at a selected intermediate point on the scale 19. Then at this intermediate value the Bourdon spring 21 and capillary tube 23 will function to compensate accurately for varying ambient temperatures along the Bourdon spring 5 and capillary tube 6. At such intermediate bulb temperature, pivot point A (Fig. 4) will not move as a result of an ambient temperature change at spring 5. However, with the temperature at the bulb 7 at the low end of its range, the volume of the fluid in the Bourdon spring 5 will be less than the volume thereof at the compensating temperature. The action of the compensating Bourdon spring 21, due to a rising temperature about the instrument case, is now more than enough to neutralize the decreased motion of the actuating Bourdon spring 5, as a result of the decreased volume of the liquid in the latter. This condition results in over-compensation, wherein there is downward motion of pivot A from $A_2$ to $A'_2$ (Fig. 5) and of the motion of pivot B from $B_2$ to $B'_2$. This results in a downscale index movement from $C_2$ to $C'_2$.

Again, with the bulb temperature at the high end of the range, the fluid volume in the Bourdon spring 5 is larger than the volume of fluid therein at the intermediate compensation temperature. As a result of this condition, undercompensation takes place with an upward motion of the pivot A from $A_3$ to $A'_3$ (Fig. 6) and a movement of pivot B from $B_3$ to $B'_3$. This results in an upscale pointer movement from $C_3$ to $C'_3$.

The bimetallic coil 14 corrects for this over-compensation and for this under-compensation. With the bulb 7 at the intermediate compensating temperature, it has been shown in the discussion relating to Fig. 4 that no motion of the point A will take place as a result of any change in the ambient temperature at the instrument case. However, it is only required for proper operation of the instrument that there be no movement of the pivot B and of the pointer C, as a result of this changing ambient temperature at any bulb temperature. In Fig. 7 it is shown how the bimetallic coil 14 is so arranged that, although it responds to ambient case temperatures, its response does not effect any appreciable movement of the points B and C when the bulb 7 is at the intermediate compensating temperature. By reference to Fig. 7, it will be noted that this condition will be satisfied when point A occupies any position on the arc A—A', which arc is defined by the link 16 swinging about the pivot B. The bimetallic coil 14 is attached at its center to the lug D on the bracket 10 which is rigidly but adjustably maintained in angular relation to arm 8. By reason of this construction when coil 14 winds up or unwinds, pivot A will travel substantially in an arc A—A" centered at D. Over the small angular range and provided D lies on the line AB, the arcs A—A' and A—A" may be considered as substantially straight lines both coincident with arm 8, so that no motion of the pivot point B occurs. Under these conditions the bimetallic coil 14 has substantially no effect on the position of the index. However, with the temperature at the bulb at the low end of its range, as shown in Fig. 8, there will be motion of the point $A_2$ to $A'_2$ on an increase in ambient temperature at the case, in the absence of the bimetallic coil 14. For a correct indication by the index 17 under the condition just mentioned, points $B_2$ and $C_2$ should not move in response to the ambient temperature at the case. Point A should therefore lie on arc $A_2$—$A''_2$. The bimetallic coil 14 will rotate about the point $D_2$ on a change in ambient temperature, describing the arc $A'_2$—$A''_2$, and therefore brings the pivot $A_2$ back on the arc $A_2$—$A''_2$ as required.

When the temperature at the bulb 7 is at the top of its range, the mentioned parts will operate in a similar manner but in the opposite sense, to compensate for the varying ambient temperature at the case.

We claim:

1. A condition measuring device including a tube system comprising a first Bourdon spring wound in one sense and having a first end thereof communicating with a bulb through a capillary tube, a movable member, means having an effective length varying in predetermined relation to surrounding temperature changes for connecting said member to the second end of said Bourdon spring for actuation thereby, a fluid completely filling said tube system, a temperature compensating tube system comprising a second Bourdon spring wound in the opposite sense from the first Bourdon spring and having a fixed end as well as a free end, the fixed end of the second Bourdon spring communicating with a second capillary tube exposed throughout its length to substantially the same temperature conditions as said first mentioned capillary tube, a bracket mounted on the free end of said second Bourdon spring and secured to said first end of said first Bourdon spring whereby said Bourdon springs act in opposition in response to surrounding temperature changes.

2. A temperature measuring device including a tube system comprising a first Bourdon spring wound in one sense and having a first end thereof communicating with a bulb through a capillary tube, a liquid completely filling said tube system, a rotatable member, a take-off arm having one of its end portions attached to the second end of said first Bourdon spring, a bimetallic coil having one end thereof carried by the remaining end of said arm, a pivot carried by the other end of said bimetallic coil, a link connecting said pivot to said member, a temperature compensating tube system comprising a second Bourdon spring wound in the opposite sense from the first Bourdon spring and having a fixed end as well as a free end, the fixed end of the second Bourdon spring communicating with a second capillary tube exposed throughout its length to substantially the same temperature conditions as said first mentioned capillary tube, a bracket mounted on the free end of said second Bourdon spring, and secured to said first end of said first Bourdon spring whereby said Bourdon springs act in opposition in response to surrounding temperature changes.

3. A condition measuring device including a tube system comprising a first Bourdon spring wound in one sense and having a first end thereof communicating with a bulb through a capillary tube, a liquid completely filling said tube system, a movable member, a take-off arm having one of its end portions attached to the second end of said first Bourdon spring, means including a temperature actuated strip effectively connecting said member to different lengths of said arm depending on ambient temperatures, a temperature compensating tube system, comprising a second Bourdon spring wound in the opposite sense from the first Bourdon spring and having a fixed end as well as a free end, the fixed end of the second Bourdon spring communicating with a second capillary tube exposed throughout its length to substantially the same temperature conditions as said first mentioned capillary tube, a bracket mounted on the free end of said second Bourdon spring and secured to said first end of said first Bourdon spring whereby said Bourdon springs act in opposition in response to surrounding temperature changes.

4. A condition measuring device including a tube system comprising a first Bourdon spring wound in one sense and having a first end thereof communicating with a bulb through a capillary tube, a fluid completely filling said tube system, a rotatable member, a take-off attached to the second end of said first Bourdon spring, a bimetallic element having one end thereof carried by said take-off, a pivot carried by the other end of said bimetallic element, a link connecting said pivot to said member, a temperature compensating tube system comprising a second Bourdon spring wound in the opposite sense from the first Bourdon spring and having a fixed end as well as a free end, the fixed end of the second Bourdon spring communicating with a second capillary tube exposed throughout its length to substantially the same temperature conditions as said first mentioned capillary tube, a bracket mounted on the free end of said second Bourdon spring, and secured to said first end of said first Bourdon spring whereby said Bourdon springs act in opposition in response to surrounding temperature changes.

5. A condition measuring device including a tube system comprising a first Bourdon spring wound in one sense and having a first end thereof communicating with a bulb through a capillary tube, a fluid completely filling said tube system, a rotatable member, a take-off attached to the second end of said first Bourdon spring whereby said take-off is swung in an arc, a temperature controlled unit positioned by said take-off and having a portion moved in response to changes in ambient temperature in an arc extending generally in the direction of said take-off, means connecting said portion to said member, a temperature compensating tube system comprising a second Bourdon spring wound in the opposite sense from the first Bourdon spring and having a fixed end as well as a free end, the fixed end of the second Bourdon spring communicating with a second capillary tube exposed throughout its length to substantially the same temperature conditions as said first mentioned capillary tube, a bracket mounted on the free end of said second Bourdon spring, and secured to said first end of said first Bourdon spring whereby said Bourdon springs act in opposition in response to surrounding temperature changes.

KARL H. HUBBARD.
HENRY L. MASON.
JONATHAN L. LEACH.